United States Patent
Gerding et al.

(10) Patent No.: US 10,782,174 B2
(45) Date of Patent: Sep. 22, 2020

(54) DEVICE FOR MEASURING THE DISTANCE TO AN OBJECT

(71) Applicant: KROHNE Messtechnik GmbH, Duisburg (DE)

(72) Inventors: Michael Gerding, Bochum (DE); Uwe Wegemann, Moers (DE); Christoph Schmits, Dortmund (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 430 days.

(21) Appl. No.: 15/471,059

(22) Filed: Mar. 28, 2017

(65) Prior Publication Data
US 2017/0276533 A1 Sep. 28, 2017

(30) Foreign Application Priority Data

Mar. 28, 2016 (DE) .................. 10 2016 105 646

(51) Int. Cl.
| | |
|---|---|
| *G01F 23/284* | (2006.01) |
| *G01S 7/02* | (2006.01) |
| *G01S 13/87* | (2006.01) |
| *G01S 7/00* | (2006.01) |
| *G01S 7/40* | (2006.01) |
| *G01F 23/00* | (2006.01) |

(52) U.S. Cl.
CPC ............ *G01F 23/284* (2013.01); *G01S 7/003* (2013.01); *G01S 7/023* (2013.01); *G01S 13/87* (2013.01); *G01F 23/0076* (2013.01); *G01S 7/4004* (2013.01)

(58) Field of Classification Search
CPC ...... G01F 23/284; G01F 23/00; G01F 23/268; G01F 23/2962; G01F 22/00; G01F 22/02; G01F 13/00; G01F 25/0092; H01Q 1/225; H01Q 1/22; G01S 7/4004; G01S 13/88; G01S 13/08; G01S 13/10; G01S 7/023
See application file for complete search history.

(56) References Cited

U.S. PATENT DOCUMENTS

| | | | |
|---|---|---|---|
| 5,907,301 | A | 5/1999 | Andersson |
| 5,920,279 | A | 7/1999 | Andersson |
| 6,452,536 | B1 | 9/2002 | Thomassen |
| 6,995,706 | B2 | 2/2006 | Ohlsson |
| 7,830,532 | B2 | 11/2010 | De Coi |
| 9,207,111 | B2 * | 12/2015 | Gerding ............. G01F 23/2961 |

(Continued)

*Primary Examiner* — Olumide Ajibade Akonai
(74) *Attorney, Agent, or Firm* — David S. Safran; Roberts Calderon Safran & Cole, P.C.

(57) ABSTRACT

Described and shown is a device for measuring the distance to an object, including at least two freely radiating transmitter units for transmitting an electromagnetic measuring signal, at least one receiver unit for receiving a reflection signal reflected on the object, and at least one evaluation unit. The at least one receiver unit forwards the received reflection signal to the at least one evaluation unit. The transmitter units and the at least one receiver unit are arranged within one measuring environment. The transmitter units and the at least one receiver unit have at least one common measuring frequency range. The operation of the transmitter units is coordinated so that the measuring signals transmitted by the transmitter units and the reflection signals resulting from the measuring signals can be differentiated from one another.

11 Claims, 3 Drawing Sheets

(56) References Cited

U.S. PATENT DOCUMENTS

| | | | |
|---|---|---|---|
| 2005/0179584 A1* | 8/2005 | Ohlsson | G01F 23/284 342/124 |
| 2005/0206557 A1* | 9/2005 | Holmberg | G01S 13/26 342/191 |
| 2016/0033622 A1* | 2/2016 | Martone | G01S 13/04 342/18 |

* cited by examiner

DEVICE FOR MEASURING THE DISTANCE TO AN OBJECT

BACKGROUND OF THE INVENTION

Field of the Invention

The present invention relates to a device for measuring the distance to an object, comprising at least two freely radiating transmitter units for transmitting an electromagnetic measuring signal, at least one receiver unit for receiving a reflection signal reflected on the object and at least one evaluation unit, wherein the at least one receiver unit forwards the received reflection signal to the at least one evaluation unit, the transmitter units and the at least one receiver unit are arranged within one measuring environment and that the transmitter units and the at least one receiver unit have at least one common measuring frequency range.

The invention relates, in particular, to the measurement of the distance of a transmitter or receiver unit to a surface of a bulk material in a container.

Description of Related Art

Fundamentally, it is known to determine distances to an object, for example the surface of a bulk material in a container, based on the transit time of a measuring signal reflected on the object. For this, a measuring signal, for example in the form of a pulse-like radar signal, is transmitted from a transmitter unit in the direction of the object and, after reflection on the object, is received by a receiver unit. The received signal is then forwarded to an evaluation unit for evaluation. The distance of the transmitter unit to the object can be determined from the transit time. In the case of fill level measurement, the fill level in the container can be determined from the distance of the transmitter unit to the surface of the bulk material. The transmitter unit is often simultaneously designed as receiver unit.

Furthermore, it is known to use a linear frequency-modulated radar signal as a measuring signal in the above-described method. For evaluating the received reflection signal and for determining the distance to the object, the difference frequency is determined from the present transmitter frequency and the received frequency. This is directly proportional to the distance of the object.

For increasing the operating and failure safety, at least one further functionally equivalent or comparable transmitter unit is present in generic devices. In the case of failure of one transmitter unit, it can be ensured that operation of the device is not interrupted, due to the use of at least two transmitter units. If the transmitter units are simultaneously designed as receiver units, the use of at least two transmitter and receiver units, which each individually determine the distance to the object, ensures a particularly high failure safety.

The transmitter units and the at least one receiver unit of a generic device have one measuring frequency range, within which the transmitter units and the at least one receiver unit are operated. This means that the frequency of the measuring signals transmitted by the transmitter unit lies within the sensitivity range of the receiver unit. The reflection signal received by the receiver unit or a measuring signal derived from it is then forwarded to the evaluation unit when the frequency of the reflection signal lies within the measuring frequency range of the receiver unit. Frequencies outside of the unit-specific measuring frequency range are, for example, filtered out by corresponding high and/or low pass filters.

If it is said that the transmitter units and the receiver unit have a common measuring frequency range, then it is meant that the transmitter units and the receiver units have a common frequency range in which each transmitter and each receiver unit is operated, i.e., in which the transmitter unit transmits electromagnetic signals and the receiver unit receives electromagnetic radiation as relevant measuring signal. It is particularly preferred that the measuring frequency range of the transmitter units and of the at least one receiver unit are identical. If the transmitter units and the receiver units have identical measuring frequency ranges, the quality of the measurements is maintained when one of the transmitter units malfunctions.

Furthermore, the transmitter units and the receiver unit in generic devices are arranged within one measuring environment. This is the case if and only if the receiver unit at least partially receives the measuring and reflection signal from each transmitter unit. If more than one receiver unit is provided, the transmitter and receiver units are arranged within one measuring environment if and only if each receiver unit receives the measuring and reflection signal from at least two transmitter units, especially if each receiver unit receives the measuring and reflection signal from each transmitter unit. Additionally, several transmitter or receiver units in the scope of the present invention are arranged within one measuring environment only when the distance measurement relates to the same object. Then, the additionally provided transmitter and receiver units improve the functional safety of the unit in that they maintain operation of the device when one transmitter unit malfunctions. In this case, the additionally provided transmitter units replace the malfunctioning transmitter unit. If the transmitter units are simultaneously designed as receiver units, the additionally provided transmitter and receiver units replace a malfunctioning transmitter and receiver unit.

For example, the transmitter units and the at least one receiver unit are arranged in the same container, wherein the distance to the surface of a bulk material is measured.

If several transmitter and receiver units are simultaneously operated within a measuring frequency range, it is possible that the transmitter or receiver unit influence one another, which can be seen in the measuring errors of the measured distance.

SUMMARY OF THE INVENTION

On that basis, the object of the present invention is to provide a device for measuring the distance to an object, which has a particularly high operating safety as well as a particularly high reliability.

This object is achieved according to the invention in that the operation of the transmitter units is coordinated so that the measuring signals transmitted by the transmitter units and the reflection signals resulting from the measuring signals can be differentiated from one another and the receiver unit is able to clearly assign each measuring signal and reflection signal to one specific transmitter unit regardless of the arrangement of the transmitter units.

In order to avoid measuring errors that result from a measuring and reflection signal received by the receiver unit that cannot be clearly assigned to one of the transmitter units, the transmitted measuring signals can be differentiated from one another, namely regardless of the arrangement of the transmitter units. If two measuring signals can only be clearly assigned to a transmitter unit based on their spatial propagation, then they cannot be differentiated in the sense of the invention.

As a result, the device according to the invention thus has the advantage that a particularly high operating safety can be ensured due to the use of at least two transmitter units, wherein it is ensured that the transmitter units, in the case that at least two transmitter units are simultaneously operated, operate without failure.

According to a preferred design, the device comprises a fill level meter for measuring the fill level in a container. A corresponding fill level measurement takes place particularly reliably by the device according to the invention and complies with particularly high safety requirements.

According to a further preferred design, each transmitter unit is simultaneously a receiver unit. This design is characterized in the following in that the transmitter unit and the receiver unit are identical. A corresponding design of the device according to the invention has the advantage that the device is particularly simply designed.

Preferably, the measuring signal is a pulse-like or frequency-modulated radar signal.

The device according to the invention can be improved in that the operation of the transmitter units is coordinated in such a manner that only one transmitter unit is active at a time. Preferably, the transmitter unit alternately transmits a measuring signal in the direction of the object. If the measuring signals are received by a receiver unit, they are clearly assigned to the individual transmitter units in that they are received temporally shifted. If the transmitter units are simultaneously designed as receiver units, it is particularly preferred when each receiver unit is simultaneously active with the identical transmitter unit. This ensures that the receiver units do not receive measuring signals from transmitter units that are not identical to them. Additionally, the design has the advantage that each transmitter unit can be operated in the whole measuring bandwidth, whereby particularly high resolution is provided.

For implementing intermittent operation of the transmitter units, a higher-level control is implemented. The control is connected to each transmitter unit via a communication connection.

In one design of the device according to the invention, the higher-level control in one transmitter unit is implemented so that it is sufficient when the other transmitter units have communication contact to the transmitter unit, in which the higher-level control is implemented. The communication connection to the transmitter unit having the higher-level control is implemented in a star shape in one design. In an alternative design, it is implemented in a ring shape. It is common to both variations that the transferred data of each transmitter unit signalizes whether or not it is active.

According to a preferred design, a communication cable is provided that connects the transmitter units to one another, wherein the transmitter units can exchange data, in particular a synchronization signal, via the communication cable. A coordination of the operation of the transmitter units can consequently take place via the communication cable. According to this design, a particularly simple and safe communication among the transmitter units is ensured. The communication cable can be a part of a bus cabling system or can directly connect the transmitter units to one another.

Alternatively, a wireless interface can be provided between the transmitter units, wherein the transmitter units can exchange data, in particular a synchronization signal, via the wireless interface. Preferably, the coordination of the operation of the transmitter units takes place via the wireless interface. A device designed in this manner has the advantage that it is particularly simply designed. It is particularly preferred that a wireless communication interface is provided. The use of a wireless interface is, in particular, advantageous when the device has three or more transmitter units.

If the transmitter units are simultaneously designed as receiver units and if the operation of the transmitter units is coordinated so that only one individual transmitter and receiver unit is active at a time, it is further particularly preferred when, at regular or irregular intervals, only one receiver unit is active at a time, without the associated transmitter unit. If the active receiver unit measures a reflection signal when the associated transmitter unit is not active, this indicates an error function of the further transmitter and receiver unit. Particularly reliable operation can thus be ensured according to this design.

Such an error function can result, for example, from a time measurement system arranged in the transmitter and receiver units, for example oscillating quartz, having different accuracies or drifting over time.

It is also preferred when the measuring frequency range, at which the transmitter units are operated, has at least two measuring sub-bands and when the operation of the transmitter units is coordinated in such a manner that the transmitter units are operated in different measuring sub-bands. If only one receiver unit is provided, then this receiver unit is designed according to the above-described design so that it receives the signals in the frequencies of the at least two measuring sub-bands and these signals or variables derived from them are forwarded to the evaluation unit. Using the respective frequencies, a measuring signal can be clearly assigned to a transmitter unit. If the transmitter units are simultaneously designed as receiver units, it is preferred when the receiver units only receive and forward the frequencies that lie in the measuring sub-band assigned to its identical transmitter unit.

The above described design has the advantage that the transmitter units can be simultaneously operated, whereby a particularly high measuring rate can be provided. This applies, in particular, when the at least two measuring sub-bands do not have a common frequency.

According to a further preferred design, the device has an own calibration kit for each measuring sub-band.

It is also advantageous when the measuring and reflection signals can be differentiated in that they are transmitted shifted temporally and have frequencies that can be assigned to the different measuring sub-bands. According to this design, a particularly reliable assignment of the measuring and reflection signals to a transmitter unit can be made.

It is further preferred when each transmitter unit is simultaneously a receiver unit and when the measuring frequency range has at least one communication sub-band, wherein each transmitter unit and each receiver unit is operated at least in the at least one communication sub-band. The transmitter units inform the rest of the receiver units about their operation by transmitting and receiving a measuring signal with a frequency that lies within the communication sub-band, wherein a further connection between the transmitter units, for example in the form of a cable connection or wireless connection, can be done without. This design is particularly advantageous when the differentiation of the measuring and reflection signals is carried out by temporally shifting the transmission of the measuring signals.

Alternatively, the different types of communication among the transmitter units can also be combined with one another. If the frequency band, in which the transmitter units are operated, simultaneously has at least two measuring sub-bands, it is advantageous when the communication sub-band and the measuring sub-bands do not have a common frequency.

In detail there is a plurality of possibilities for designing the device according to the invention for measuring the distance to an object, as will be apparent from the following description of preferred embodiments in conjunction with the accompanying drawings.

DETAILED DESCRIPTION OF THE INVENTION

Figure 1:
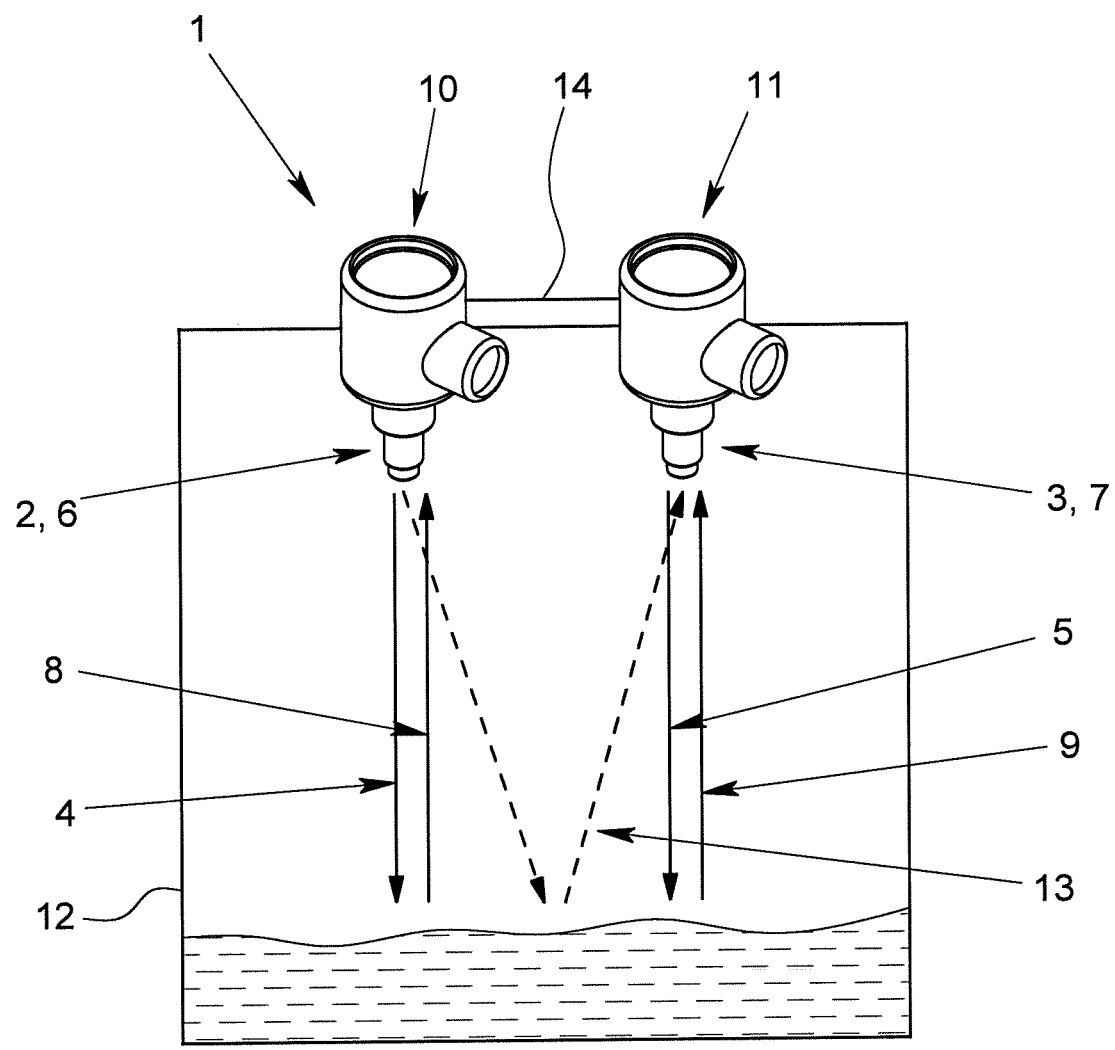
FIG. 1 is a first embodiment of a device according to the invention.

A first embodiment of a device 1 for measuring the distance to a surface of a bulk material in a container 12 is illustrated in FIG. 1. The device 1 comprises two freely radiating transmitter units 2, 3 for transmitting an electromagnetic measuring signal 4, 5 in the form of a frequency modulated radar signal, two receiver units 6, 7 for receiving a reflection signal 8, 9 reflecting on the surface of the bulk material, wherein each transmitter unit 2, 3 is designed as a receiver unit 6, 7 and wherein each receiver unit 6, 7 at least partially also receives reflections with its non-identical transmitter unit 2, 3, which is illustrated by the receipt of reflection signals 13 as an example. Furthermore, the device 1 comprises two evaluation units 10, 11 that determine the distance to the surface of the bulk material from the transit time of the received reflection signals 8, 9 and the difference frequency between the received reflection signal 8, 9 and the transmitted measuring signal 4, 5.

Additionally, the transmitter units 2, 3 and, thus, the receiver units 6, 7 are arranged within one measuring environment. In the illustrated embodiment, the transmitter units 2, 3 and the receiver units 6, 7 are arranged within the same container 12 and measure the distance to the same surface of the bulk material. Furthermore, the transmitter units 2, 3 and the receiver units 6, 7 have an identical measuring frequency range. In order to avoid the transmitter units 2, 3 and the receiver units 6, 7 from influencing one another due to a receiver unit 6, 7 receiving a reflection signal 13 from a transmitter unit 2, 3 that is not identical to it, the operation among the transmitter units 2, 3 is coordinated. The measuring signals 4, 5 can be differentiated from one another and a clear assignment of each measuring signal to a transmitter unit 2, 3 is possible regardless of the arrangement of the transmitter units.

The communication of the transmitter units 2, 3 among one another and, in this respect, the coordination of the operation of the transmitter units 2, 3, is carried out via a communication cable 14 that connects the transmitter units 2, 3 to one another. In the illustrated embodiment, the operation of the transmitter units 2, 3 is coordinated in such a manner that the transmitter units 2, 3 are operated at frequencies of different measuring sub-bands of the measuring frequency range. In this respect, the measuring signals 4, 5 differ in their frequencies. The receiver units 6, 7 are designed in such a manner that they only receive and forward to the evaluation unit 10, 11 frequencies that are transmitted from the transmitter unit 2, 3 that is identical to the associated receiver unit. Influencing among one another of the transmitter and the receiver units 6, 7 is thus eliminated.

According to another embodiment, the communication cable 14 is not used in the above-described arrangement.

In this respect, the embodiment illustrated in FIG. 1 provides a device 1 that, due to the use of several transmitter and receiver units 6, 7, has a particularly high measuring accuracy and a particularly high operating safety, wherein it can be ensured that the transmitter units 2, 3 operate failure-free.

Figure 2:
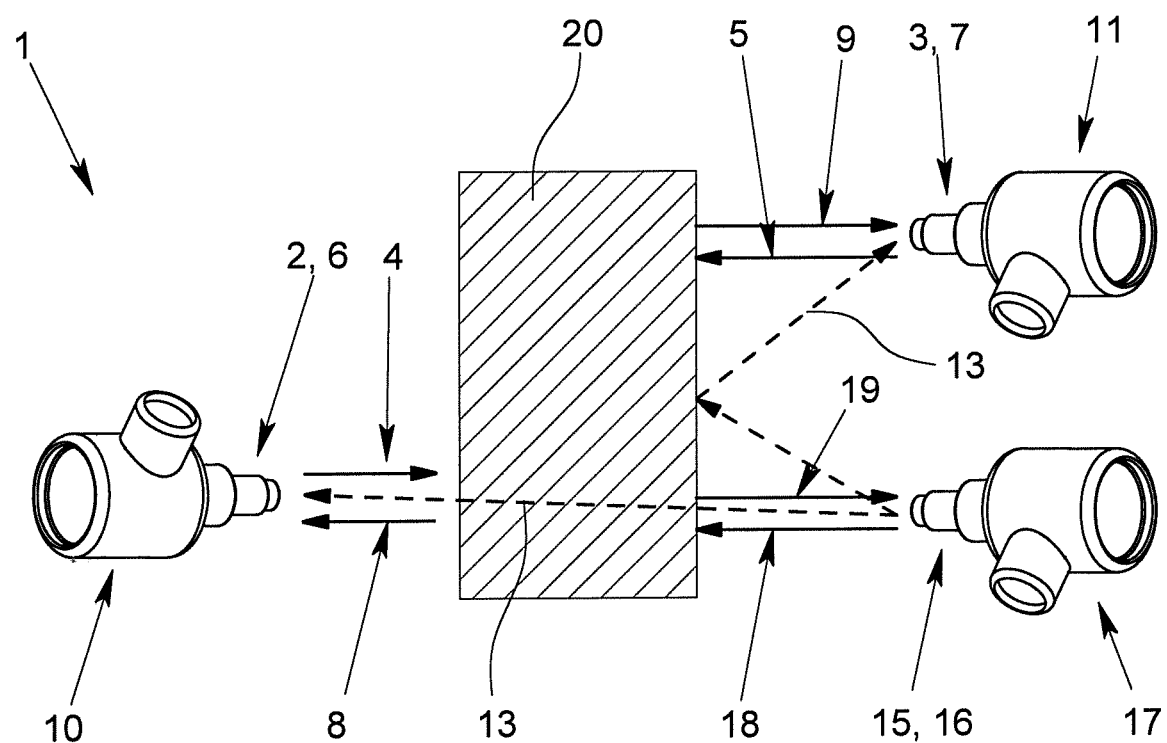
FIG. 2 is a second embodiment of a device according to the invention.

FIG. 2 shows a second embodiment of a device 1 according to the invention. The illustrated device 1 has three freely radiating transmitter units 2, 3, 15 that are simultaneously designed as receiver units 6, 7, 16 as well as three evaluation units 10, 11, 17. The transmitter units 2, 3 15 are designed and arranged in such a manner that they each transmit an electromagnetic measuring signal 4, 5, 18 in the form of a pulse-like radar signal in the direction of the object 20 whose distance from the transmitter units 2, 3, 15 is to be determined. The signal, which is received by the receiver unit 6, 7, 15 after reflection on the object 20, is forwarded to the evaluation unit 10, 11, 17. The receiver units 6, 7 are designed and arranged in such a manner that they at least partially receive the measuring and reflection signals of all transmitter units 2, 3, 15. This is illustrated as an example by the course of the measuring signal 13. Additionally, the transmitter and receiver units 6, 7, 16 have identical measuring frequency ranges. In order to avoid the transmitter and receiver units 6, 7, 16 from influencing one another, the operation of the transmitter units 2, 3, 15 is presently coordinated so that a clear assignment of each measuring and reflection signal 8, 9, 19 to one of the transmitter units 2, 3, 15 is possible. Presently, the transmitter units 2, 3, 15 communicate among one another via a wireless interface, via which the coordination of the operation of the transmitter units 2, 3, 15 is carried out in succession.

In the illustrated embodiment, the coordination of the operation of the individual transmitter units 2, 3, 15 is carried out in such a manner that only one, single transmitter unit 2, 3, 15 is active at a time. At the same time, the associated receiver unit 6, 7, 16 is active only when the transmitter unit 2, 3, 15 identical to it is active. Subsequently, it is ensured that a receiver unit 6, 7, 16 does not register measuring signals 13 transmitted by a transmitter unit 2, 3, 15 that is not identical to this receiver unit.

As a result, the embodiment illustrated in FIG. 2 also provides a device 1 for measuring the distance to an object 20, which has a particularly high measuring accuracy and operating safety by using three transmitter units 2, 3, 15 and three receiver units 6, 7, 16, wherein failure-free operation of the transmitter and receiver units can be ensured.

Figure 3:
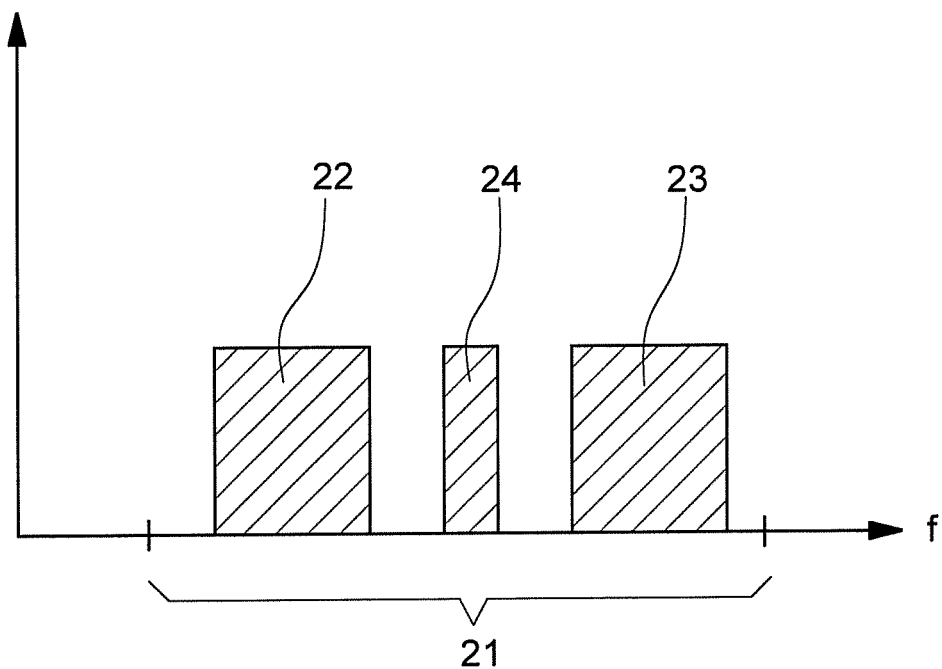
FIG. 3 is an exemplary illustration of the subdivision of the frequency band into measuring sub-bands and a communication sub-band according to the invention.

FIG. 3, as an example, illustrates a diagram of the subdivision of a measuring frequency range, at frequencies in which the transmitter and receiver units are operated. The range 21 corresponds to the measuring frequency range. This range is subdivided into two measuring sub-bands 22, 23 that are each associated with one of the transmitter units 2, 3, 15. Furthermore, the illustrated measuring frequency range has a communication sub-band 24, the frequencies of which being transmitted or received by all transmitter and receiver units 6, 7, 16. During operation of a device 1, a receiver 6, 7, 16 can be informed solely by signals via the transmitting and receiving of frequencies within the communication sub-band 24 that transmitter units 2, 3, 15 are active.

What is claimed is:

1. A device for measuring the distance to an object, the device comprising:
    at least two freely radiating transmitter units for transmitting electromagnetic measuring signals,
    at least one receiver unit for receiving a reflection signal reflected on the object, and
    at least one evaluation unit,
    wherein the at least one receiver unit forwards the received reflection signal to the at least one evaluation unit,
    the transmitter units and the at least one receiver unit are arranged within one measuring environment,
    the transmitter units and the at least one receiver unit have at least one common measuring frequency range, wherein a common frequency range means that each transmitter unit and the receiver unit are operated in the same band of measuring frequencies to respectively transmit and receive electromagnetic signals as relevant measuring signals,
    operation of the transmitter units is coordinated so that the measuring signals transmitted by the transmitter units and the reflection signals resulting from the measuring signals are differentiated from one another, and
    the at least one receiver unit assigns each of the measuring signals and the reflection signal to a specific one of the transmitter units regardless of an arrangement of the transmitter units,
    wherein the measuring frequency range has at least two measuring sub-bands, and the operation of the transmitter units is coordinated in such a manner that each of the transmitter units is operated in a different one of the at least two measuring sub-bands.

2. The device according to claim 1, wherein the device comprises a fill level meter for measuring a fill level in a container.

3. The device according to claim 1, wherein each of the transmitter units is simultaneously a respective one of the at least one receiver unit.

4. The device according to claim 1, wherein the measuring signals transmitted by the transmitter units are a pulse-like or frequency modulated radar signal.

5. The device according to claim 1, wherein the operation of the transmitter units among one another is coordinated such that only one of the transmitter units is active at a time.

6. The device according to claim 5, wherein the transmitter units alternately transmit the measuring signals.

7. The device according to claim 5, wherein:
    the transmitter units each include one said receiver unit, and
    the operation of the transmitter units is coordinated in such a manner that only a single one of the transmitter units and one said receiver unit is active at a time, and at regular or irregular intervals, only one said receiver unit is active at a time, without the associated one of the transmitter units.

8. The device according to claim 1, wherein a communication cable connects the transmitter units to one another, and the transmitter units exchange data via the communication cable.

9. The device according to claim 1, wherein a wireless interface is provided between the transmitter units, and the transmitter units exchange data via the wireless interface.

10. The device according to claim 1, wherein an own calibration kit is provided for each of the at least two measuring sub-bands.

11. The device according to claim 1, wherein the at least two measuring sub-bands do not have a frequency in common with each other.

* * * * *